June 7, 1949.  H. A. SMITH  2,472,234
TRUCK TAIL GATE LOCK
Filed Feb. 26, 1948
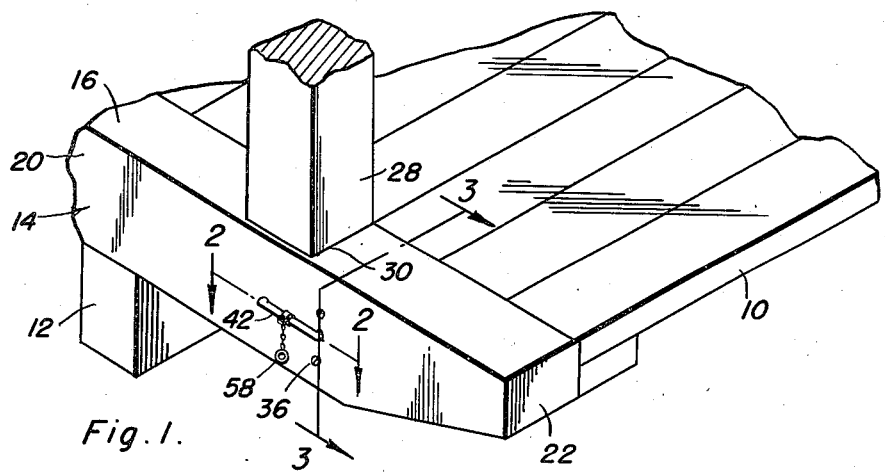
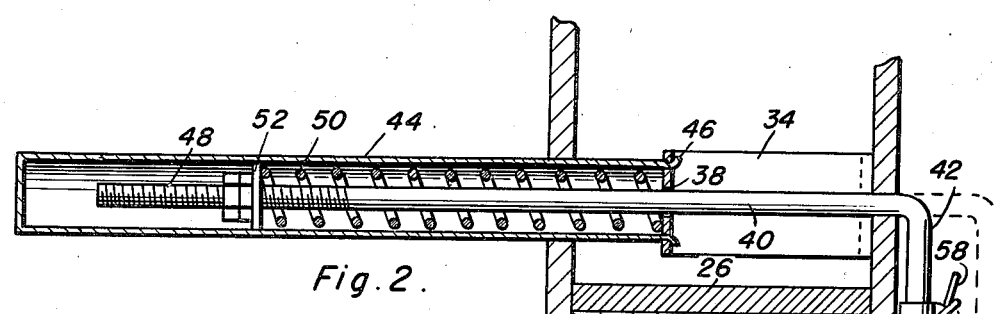
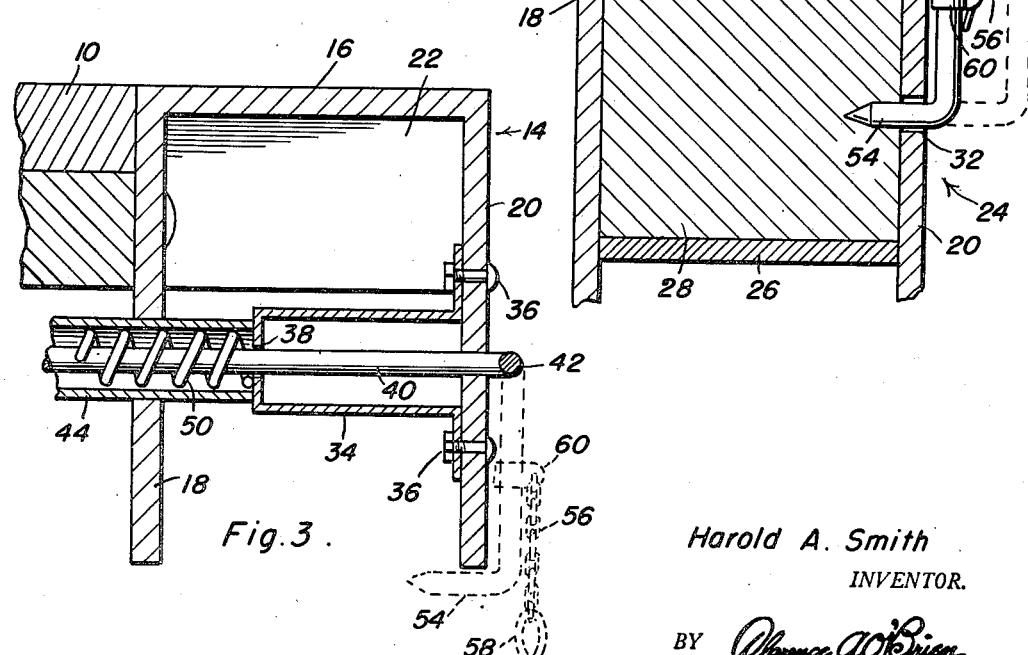
Harold A. Smith
INVENTOR.

Patented June 7, 1949

2,472,234

UNITED STATES PATENT OFFICE 2,472,234

TRUCK TAIL GATE LOCK

Harold A. Smith, Rochester, N. Y.

Application February 26, 1948, Serial No. 11,271

2 Claims. (Cl. 280—143)

This invention relates generally to truck bodies, and more particularly to a stake retaining means for a truck body including a socket in the truck body frame to receive one end of a stake and a U-shaped latch with biasing means securable in two positions in order to retain or release the stake, the stake being considered as representative of the attaching portions of such units as tail gates used on the truck.

A primary object of this invention is to provide stake retaining means which is completely dependable in action, thus insuring that tail gates and the like are not lost from the truck while the same is in transit.

Another object of this invention is to provide a stake retaining means which is extremely simple to operate and which will not readily become inoperative by reason of accumulation of dust or other material on the parts concerned.

Still another object of this invention is to provide tail gate latching means which is adaptable with many different types of truck body frames and tail gates, the device being equally adaptable for use with stakes having shoulders adapted to abut portions of the frame disposed laterally of the sockets into which the stakes are to be placed as well as several other types of stake and socket structures.

Another object of this invention is to provide stake retaining means which will not unduly weaken the stake, while providing for absolutely positive locking thereof in a socket.

Yet another object is to provide means of the character described which will not comprise an inconvenience when in inoperative position, and which protrudes very slightly from the side or rear of a truck when in operative as well as in inoperative positions.

Yet another object is to provide means of this character which can be adjusted periodically, and which can be incorporated very easily with truck bodies.

And the last object to be mentioned specifically, is to provide a latching means for truck tail gates and the like which is relatively inexpensive and practical to manufacture, which is simple, safe and expeditious to use and which will give generally efficient and durable service.

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a three dimensional fragmentary view of the rear portion of a truck body and a portion of a stake which may be considered a part of a tail gate, with this invention operatively applied thereto and with the latch shown in position retaining the stake in place;

Figure 2 is a horizontal sectional view, taken on a plane through the line 2—2 in Figure 1; and Figure 3 is a vertical transverse sectional view taken on a plane substantially through the line 3—3 in Figure 1, this figure also including representation in dash lines of the U-shaped latch in inoperative position.

Similar characters of reference designate similar or identical elements and portions throughout the specification and throughout the several views of the drawing.

Referring now to the drawing in detail, the environment wherewith this invention is adapted to be used will include a truck which will ordinarily have a platform and frame members such as those indicated at 12 and 14. The frame member 12 is disposed longitudinally of the truck body while the frame member 14, used to represent any such frame member on a truck body used to support tail gates and the like, is represented in Figure 1 as disposed transversely of the truck body and on the rear end thereof. This frame member 14 may be of channel iron with a top plate portion 16, an inner depending flange 18, and an outer depending flange 20. The end of the member 14 is represented as closed by an end plate 22, and a socket, generally indicated by the numeral 24, is provided by aperturing the top plate 16 and welding a pair of vertically disposed plates 26, spaced apart as illustrated in Figure 2, to and between the depending flanges 18 and 20.

A stake 28, representing any stake or leg portion of a tail gate, side gate or the like, will ordinarily be constructed with a shoulder at 30 in Figure 1 to abut the top wall 16 at the edges of the aperture formed therein referred to above and forming the entrance to the socket 24. Of course, the stake 28 may be constructed differently and the nature of the socket 24 may be varied considerably without affecting the structure and operation of this invention. The outside depending flange 20 is apertured at 32 opposite to the socket 24.

A generally U-shaped bracket 34 is rigidly secured to the outer depending flange 20 by bolts or rivets 36, and the inner end of this bracket is apertured at 38 to receive the longer arm 40 of the U-shaped latch 42, this longer leg 40 extending through an aperture provided therefor in the outer flange 20, through the bracket 34, and into a tube 44 carried by this bracket 34 and extending horizontally through an aperture provided therefor in the inner flange 18. If desired, this inner tube may be rigidly secured to this inner flange, but it is preferred to mount this tube 44 on the inner end of the bracket 34 by lugs 46 inserted through apertures in the end of the bracket adjacent to the aperture 38. The inner end of the longer arm 40 is threaded as indicated at 48 and a spring 50 is compressed between a washer and nut assembly 52 and the end of the bracket 34, that is, the spring is mounted within the tube 44 co-axially with the tube and longer arm 40 to urge the latch 42 into the position thereof indicated in full lines in Figures 1 and 2, as well as urging the latch into the inoperative position illustrated in dash line in Figure 3.

The latch 42 is also provided with the shorter arm 54 which, in operative position, is inserted through the aperture 32 in the outer flange 20 and into a bore or slot provided in a portion of the stake 28 within the socket 24. The outer flange 20 and the latch 42 are so proportioned and arranged that the shorter arm 54 may be swung downwardly, when the latch is in retracted position, and again allowed to move forwardly with the shorter arm 54 disposed beneath the edge of the outer flange 20, as indicated in dash line in Figure 3. In order to facilitate the manual operation of the latch 42, a chain 56 with a ring 58 and an attaching clip 60 may be provided, the clip illustrated being of strap character encircling a bight portion of the latch 42.

The operation of this invention will be clearly understood from the foregoing description of the mechanical details thereof, taken in connection with the drawing and the objects recited above. In recapitulation, it may be added that the stake 28, or a plurality of such members incorporated in a tail gate or the like, will be secured against motion relative to the frame member 14 when the shorter arm 54 is inserted through the outer flange 20 and into the stake. Where it is desired to remove the tail gate or like structure, the ring 58 is grasped and the latch 42 retracted and rotated about the longer arm 40 as an axis and again released to allow the spring 50 to retract the latch into a position such as that indicated in dash line in Figure 3. The stake 28 is now released. It will be obvious that adjustment of the coiled spring 50 may be made by advancing the nut and washer assembly 52 on the longer arm 50.

Obviously, many minor variations in the details of construction and proportionment of the various elements of this invention may be resorted to without departure from the spirit and scope of this invention, and the said scope sholuld be determined only in accordance with a proper interpretation of the terminology used in the subjoined claims.

Having described the invention, what is claimed as new is:

1. Stake retaining means for a truck body, comprising a socket in the truck body frame to receive one end of a stake, a U-shaped latch having a longer arm and a shorter arm, a bracket on said frame mounting said longer arm for horizontal sliding movement, a spring associated with said longer arm and bracket to bias said latch into a position with said shorter arm contacting said one end of a stake, said latch being pivotable about said longer arm as an axis from said position into a position with said shorter arm out of contact with said stake, said longer arm extending laterally of the socket in the frame, and the bight portion of said U-shaped latch being proportioned with reference to said frame so that said shorter arm may be disposed on one side of the frame when in inoperative position, said spring being encased in a tube carried by said bracket, and being adjustably mounted relative to said tube and said longer arm.

2. Stake retaining means for a truck body, comprising a socket in the truck body frame to receive one end of a stake, a U-shaped latch having a longer arm and a shorter arm, a bracket on said frame mounting said longer arm for horizontal sliding movement, a spring associated with said longer arm and bracket to bias said latch into a position with said shorter arm contacting said one end of a stake, said latch being pivotable about said longer arm as an axis from said position into a position with said shorter arm out of contact with said stake, said longer arm extending laterally of the socket in the frame, and the bight portion of said U-shaped latch being proportioned with reference to said frame so that said shorter arm may be disposed on one side of the frame when in inoperative position, said spring being encased in a tube carried by said bracket and being adjustably mounted relative to said tube and said longer arm, said socket having an apertured wall and said stake being apertured to receive said shorter arm when in operative position.

HAROLD A. SMITH.

REFERENCES CITED

The following references are of record in the file of this patent:

UNITED STATES PATENTS

| Number | Name | Date |
|---|---|---|
| 382,963 | Fowler | May 15, 1888 |
| 2,348,269 | Stevens | May 9, 1944 |